United States Patent Office 3,139,861
Patented July 7, 1964

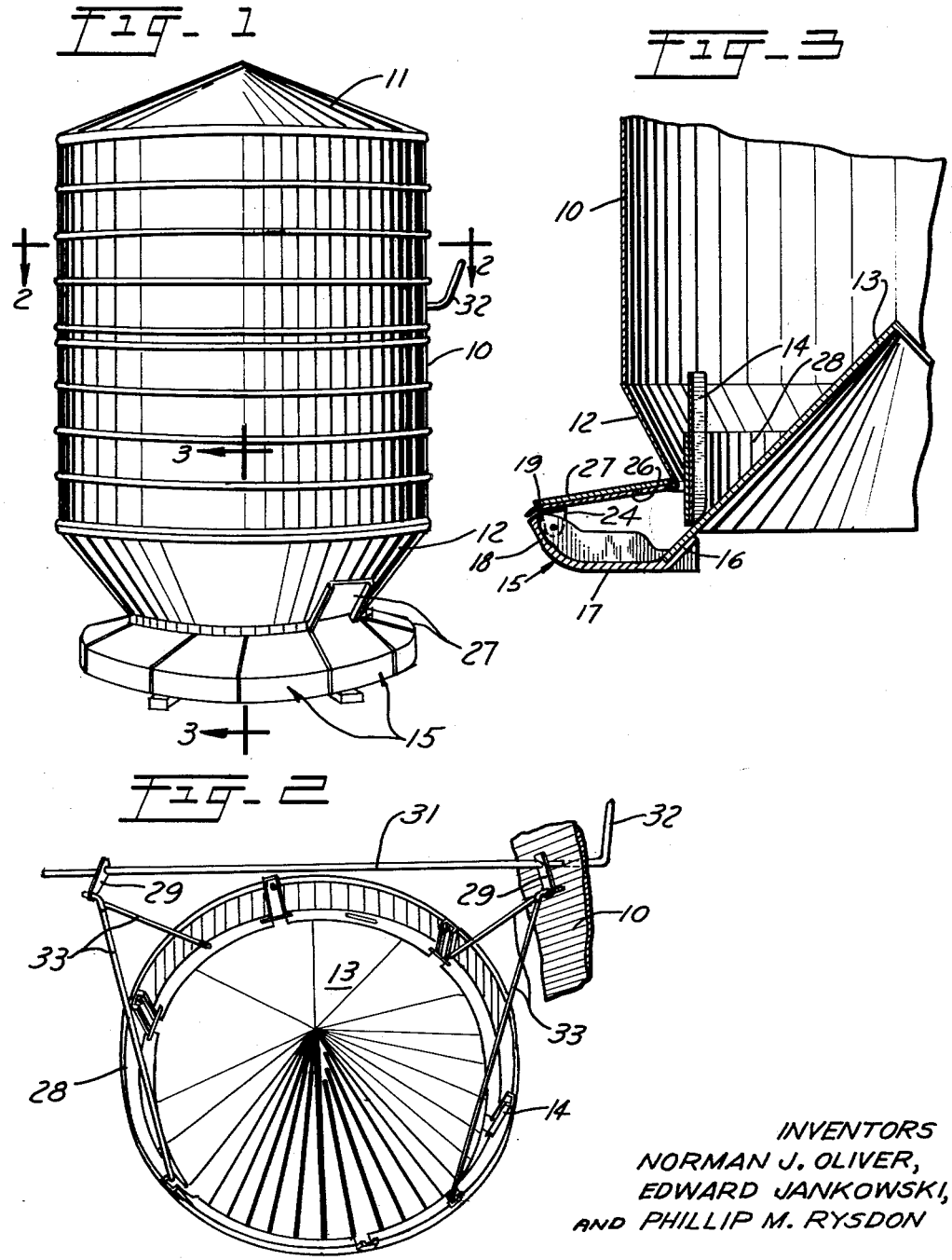

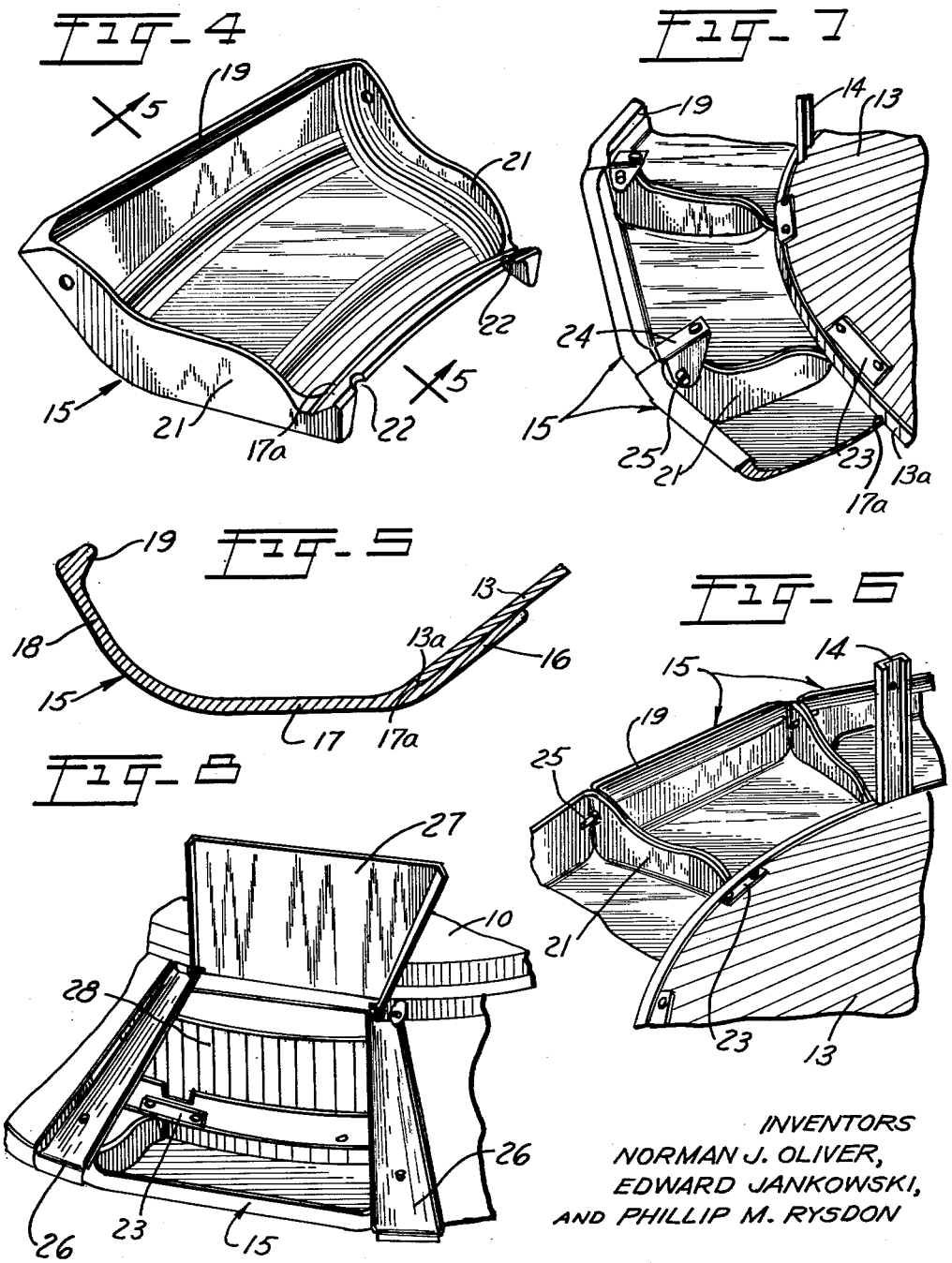

3,139,861
ANIMAL FEEDER
Norman J. Oliver, Edward M. Jankowski, and Phillip M. Rysdon, Sioux Falls, S. Dak., assignors to Sioux Steel Company, Sioux Falls, S. Dak., a corporation of Delaware
Filed Oct. 22, 1962, Ser. No. 231,928
2 Claims. (Cl. 119—53)

This invention relates to an animal feeder and more particularly to an automatic hog feeder.

Fountain type animal feeders, and specifically hog feeders, have heretofore been proposed and have been used extensively. One such feeder which has proven quite satisfactory is that shown in the patent to Rysdon, No. 2,661,720.

There have, however, been a number of problems in connection with such feeders. It has been found that feed tends to collect in the bowl or trough of feeders and that such feed becomes stale and sour in a very short time, providing a breeding place for bacteria. Other problems relate to construction of the feeders for easy erection in the place of use, separation of the animals while feeding, equal distribution of feed to the animals and regulation of the supply of feed.

One of the objects of the present invention is to provide an animal feeder which overcomes these various problems.

Another object is to provide an animal feeder in which the feed is presented to the animals in individual feeding bowls mounted in annular array around an upright feed container and supplied with feed from the container.

According to a feature of the invention, the feed bowls are of cast construction to provide smoothly rounded surfaces and are of a size and shape to be completely cleaned out by a hog so that no feed will be left therein to become stale and sour. The bowls are connected in annular array through mounting flanges at the sides thereof which separate the bowls from each other and are preferably provided with internal lips at the front which prevent a hog from dragging the feed out of the front of the bowl.

A further object is to provide an animal feeder in which a floatingly mounted control ring regulates the rate of flow of feed into the bowls and is positioned to be moved by the animals as they root for food to provide a small regulated flow of feed, as required.

According to a feature of the invention, the control ring is easily adjusted from the outside of the feeder to provide for a predetermined minimum flow of feed at all times.

The above and other objects and features of the invention will be more readily apparent from the following description when read in connection with the accompanying drawings, in which:

FIG. 1 is a perspective view of an animal feeder embodying the invention;

FIG. 2 is a top view on an enlarged scale showing the control ring and adjustable support therefor with a portion of the feed container being indicated;

FIG. 3 is a partial section on an enlarged scale on the line 3—3 of FIG. 1;

FIG. 4 is a perspective view on an enlarged scale of an individual bowl;

FIG. 5 is a section on an enlarged scale on the line 5—5 of FIG. 4;

FIG. 6 is a fragmentary perspective view on an enlarged scale showing mounting of the bowls on the feeder;

FIG. 7 is a view similar to FIG. 6 looking from a different angle; and

FIG. 8 is a partial side view on an enlarged scale of the completely assembled feeder.

The feeder, as shown, comprises an upright tank or container 10 which is of circular section and closed at its top by a cover 11 which can be removed for filling the container. At its lower end the container tapers inwardly in a conical formation, indicated at 12.

An inverted conical bottom member 13 is mounted beneath the open bottom of the container and extends to a point spaced below the lower edge of the conical container portion 12, as best seen in FIG. 3. The container and conical bottom 13 may be connected together through a series of brackets 14 which extend upwardly from the periphery of the conical bottom 13 into the container and may be secured thereto.

An annular series of feeder bowls, indicated generally at 15, are arranged around the lower part of the container to receive feed flowing therefrom through the space between the bottom of the container and the edge of the conical bottom member 13. As best seen in FIGS. 4 and 5, the individual bowls are formed by castings with upwardly turned front, bottom edges 16 blending smoothly into flat bottom portions 17 which blend into upwardly sloping forward edge portions 18. The forward edge portions 18 preferably terminate in smoothly rounded inwardly extending lips 19 extending completely across the edges to prevent the animals from dragging feed out of the bowls. At their sides the bowls are formed with upwardly extending flanges 21 which fit against each other in side-by-side relationship, as best seen in FIGS. 6 and 7, when the bowls are assembled on the feeder. The inner edge portions 16 of the bowls join with the bottoms 17 at grooves 17a and are provided with mounting notches 22 to receive mounting bolts by which they are secured to the conical bottom member 13. The terminal circular edge 13a of the cone 13 fits into the groove 17a to provide a smooth continuous surface flowing into the bottom 17 as shown in FIGURE 7.

As shown in FIGS. 6 and 7, the individual bowls 15 are assembled around the conical bottom 13 and are secured thereto by mounting plates 23 which overlie the edge portion of the bottom 13 by fastening bolts preferably having small rounded heads which extend through the plates 23 and through openings in the conical bottom 13 to engage in the notches 22 thereby to secure the bowls to the container. The abutting side flanges of adjacent bowls are connected together by inverted U-shaped brackets 24 which span the side flanges adjacent to the outer edge thereof and with bolts or similar fastenings 25 extending through openings in the brackets 24 and through registering openings in the abutting side flanges. The brackets 24 in addition to connecting the side flanges of the bowls together, serve as supports for separating members and for closures for the bowls, as described hereinafter.

For closing the bowls inverted channel strips 26 are secured at their outer ends by bolts or similar fastenings to the top flanges of the members 24 and extend inwardly and slightly upwardly to the lower edge of the container tapered portion 12 where they are similarly secured. The strips 26 have covers 27 hinged thereto adjacent to the container which are of a size to overlie and close one of the bowls. When the covers 27 are in their lowered positions, as shown in FIGS. 1 and 3, downwardly turned edges thereon extend into the channel strips 26 between the upwardly extending flanges thereof so that rain or other foreign materials cannot get into the bowls. The covers can easily be swung upward to the position shown in FIG. 8 so that the animals can have access to the bowls to feed therefrom.

For regulating the flow of feed from the container into the bowls an annular controlling ring 28 is provided which fits loosely over the brackets 14, as best seen in FIGS. 2 and 3. The ring 28 tends to drop by gravity to a position in which it closes the space between the lower edge of the tapered container portion 12 and the outer edge of the conical bottom member 13. The ring is supported from crank arms 29 which are rigidly secured to a cross shaft 31 extending across the container intermediate the top and bottom thereof. A handle 32 is provided on one end of the cross shaft outside of the container through which the position of the crank arms can easily be adjusted, means being provided, not shown, to hold the cross shaft in any position in which it may be moved. Tension elements, such as rods 33, are pivotally secured to the outer ends of the crank arms 29 and extend downwardly to connect to the control ring 28 at spaced points in its circumference so that by adjusting the shaft 31 the maximum lowered position of the control ring can be adjusted. It will be seen that the control ring is exposed at the back portion of each of the bowls so that an animal in rooting for feed in the bowl can engage the control ring and raise it thereby to permit an additional quantity of feed to flow from the container into the bowl.

Due to this feature, a minimum amount of feed may be contained in the bowls at any one time thereby eliminating waste. However, if it is desired to fill the bowls or to maintain a predetermined quantity of feed therein, the position of the control ring can easily be adjusted by turning the shaft 31 through the handle 32 so that there will be a constant quantity of feed contained in each of the bowls at all times.

It will be seen that with the present invention, the bowls may be shaped to the average dimension of hogs' mouths and jowls so that the hogs can completely clean out feed in the bowls which would otherwise become stale and sour. The bowls present smooth surfaces without any angular edges on which the animals can be cut and without any corners in which feed can collect. All bolts or other fastenings may be provided with round heads or countersunk heads providing smooth surfaces so that the animals will not be damaged.

The provision of the side flanges 21 on the bowls not only enables the bowls to be formed with maximum strength and minimum weight, but further serves to permit equal distribution of feed to each bowl, to prevent the hogs from getting into adjoining bowls and to keep small pigs from crawling into the trough and becoming trapped. As the animals are feeding, each hog can work the control ring in its individual bowl to obtain additional feed, as required.

It will further be seen that the construction involved is a relatively simple one involving a relatively small number of parts and providing for a simple assembly. It can therefore easily be shipped dis-assembled and erected at the point of use.

While one embodiment of the invention has been shown and described herein, it will be understood that it is illustrative only and not to be taken as a definition of the scope of the invention, reference being had for this purpose to the appended claims.

What is claimed is:

1. In an animal feeder comprising an upright cylindrical container tapering at its lower part to a lower edge defining a discharge opening, a conical bottom for the container having a terminal circular edge spaced from said lower edge to provide a flow space for feed, upright bracket means securing said conical bottom to said container, and a control ring mounted slidably in said discharge opening partially blocking said flow space, the improvement which comprises a plurality of individual segmental feed bowls secured in annular array around said discharge opening, each said bowl having a smoothly rounded interior and a groove adjacent its inner edge portion for receiving said terminal circular edge, fastener means for securing said inner edge portion to said terminal circular edge thereby providing a smooth transition from said circular edge to the bottom surface of said bowl, a shaft extending horizontally through said container, crank arms on said shaft, hangers from said crank arms supporting said control ring in spaced relation with said terminal circular edge, and a handle on said shaft outside the container for turning said crank arms to adjust the size of said flow space.

2. The feeder of claim 1 which includes an inverted elongated channel overlying the adjoining side walls of adjacent bowls in said array, each channel being secured to said adjoining bowls at their outer ends and to said lower container edge at their inner ends, and cover means for each bowl hinged at said lower container edge and adapted to rest on the top of said channel when in closed position.

References Cited in the file of this patent

UNITED STATES PATENTS

| | | |
|---|---|---|
| 1,141,059 | Hershey | May 25, 1915 |
| 1,346,936 | Brown | July 20, 1920 |
| 1,822,289 | Helmers | Sept. 8, 1931 |
| 2,226,476 | Maggart | Dec. 24, 1940 |
| 2,808,029 | Geerlings | Oct. 1, 1957 |